United States Patent Office 3,573,222
Patented Mar. 30, 1971

3,573,222
DEFOAMING COMPOSITION, ITS USE AND
PROCESS FOR ITS PREPARATION
George Conrad Harrison, Jr., Wayne, and Anthony Joseph
Stumpo, Philadelphia, Pa., assignors to Pennwalt Corporation, Philadelphia, Pa.
No Drawing. Continuation-in-part of application Ser. No.
655,738, July 25, 1967, which is a continuation-in-part
of application Ser. No. 571,984, Aug. 12, 1966. This
application July 2, 1969, Ser. No. 857,249
(Filed under Rule 47(a) and 35 U.S.C. 116)
Int. Cl. B01d *19/04*
U.S. Cl. 252—321        11 Claims

ABSTRACT OF THE DISCLOSURE

Composition useful for defoaming consisting essentially of from about 70 to about 95 parts by weight of a hydrocarbon fluid and from about 5 to about 30 parts by weight of a synthetic alkali metal or alkaline earth metal silico aluminate having an average particle size no greater than about 200 millimicrons, said silico aluminate having been made hydrophobic while in said hydrocarbon or halocarbon fluid by reaction at a temperature not exceeding about 75° C. with about 7% to about 30% by weight of said silico aluminate of a halosilane.

---

This application is a continuation-in-part of Ser. No. 655,738, filed July 25, 1967, and now abandoned, which in turn is a continuation-in-part of Ser. No. 571,984, filed Aug. 12, 1966, now abandoned.

Numerous defoaming compositions are known in the art, but each of them has various disadvantages and there is a need for easily obtainable, inexpensive defoaming compositions of high efficiency. Defoamers such as the commercial silicones have proved very effective for preventing or reducing foaming some aqueous systems, but these materials are relatively costly and, therefore, add significant costs to any process or product in which they are used. Another type of defoaming composition is that described in U.S. Pat. 3,076,768 where silica is first made hydrophobic and then suspended in a hydrocarbon liquid in the presene of a surfacant. A significant disadvantage in this latter product is the fact that the process is somewhat complex and involves first treating the silica with a hydrophobic material such as a dimethylpolysiloxane oil and then heating the treated silica at high temperature (250° C.–350° C.) to render it hydrophobic. U.S. Pat. 3,408,306 is a related patent which describes a process for controlling foaming using a defoamer composition comprising a water-insoluble hydrophobic organic liquid and finely divided silica or other finely divided particles, including those referred to in U.S. 2,795,545, made by hydrophobic by a variety of techniques.

It has now been found in accordance with this invention that a very easily prepared, low cost, extremely efficient defoaming composition is provided in the composition consisting essentially of from about 70 to 95 parts by weight of a hydrocarbon or halohydrocarbon fluid and from about 5 to about 30 parts by weight of a synthetic alkali metal or alkaline earth metal silico aluminate having an average particle size below about 200 millimicrons, said silico aluminate having been made hydrophobic by reacton with a halosilane.

Another embodiment of this invention includes the process for makng the novel defoaming composition. This involves use of readily available, inexpensive ingredients and the product is prepared under mild, easily attainable reaction conditions. Furthermore, it is a single-step operation and requires minimum processing. In the process of the invention, a halosilane, preferably a chlorosilane, is mixed with a hydrocarbon or halohydrocarbon fluid and the alkali metal or alkaline earth metal silico aluminate described above is slowly added with mixing. When the mixture is homogeneous and if the mixture is not already alkaline a Lewis Base is added, and then the mixture is stirred, preferably with heating to about 65° C. A reaction appears to occur at about that temperature which is almost instantaneous. Completion of the reaction may be taken when the reaction mass gives a pH above 7 using a suitable indicator. The commercial product thus obtained is immediately ready for use without further processing. If base is added an aqueous alkali metal hydroxide solution is preferred, but other aqueous alkaline solutions may be used, as for example amine solutions (e.g. ammonium hydroxide, triethanolamine, diethanolamine, etc.) alkali metal phosphates, carbonate, and the like. However, as indicated, any Lewis Base, in aqueous solution, in nonaqueous solution or even in solid form, may be added to the mixture of silico aluminate and halosilane in the preparation of the defoamer. The purpose of the base is to neutralize the haloacid formed in the reaction of the halosilane with the silicoaluminate. The term Lewis Base is well understood in the art as a substance having a lone pair of electrons available for sharing with an acid and this term is more fully explained in the Interscience Publications, Kirk-Othmer Encyclopedia of Chemical Technology, vol. 1, pages 134–137 (1947), and vol. 1, 2nd ed., pages 218–222 (1963). Reference is also made to U.S. 3,047,589 where Lewis Bases are discussed and exemplified in detail.

Many silico aluminate materials useful in the invention are sufficiently basic in nature so that no additional base need be added. In such a procedure it is preferable merely to employ somewhat more silico aluminate (or less silane) than would be used when base is added. When caustic is not employed the product is somewhat more viscous than when it is used and this provides a means to control the viscosity properties of the product.

We have found, most unexpectedly, that this invention is dependent upon the use of a synthetic alkali metal or alkaline earth metal silico aluminate of a critical average particle size (mean diameter) of no greater than about 200 millimicrons. Such materials are readily available as commercial synthetic, ultrafine, precipitated silico aluminate compounds made in accordance with known procedure such as those disclosed in the text of Iler entitled "The Colloid Chemistry of Silica and Silicates," Cornell University Press (1955) pages 184 to 186. Many of these artificial silico aluminates are used as ion exchange materials and as petroleum cracking catalysts.

The following table indicates properties of some of the silico aluminates operable in the invention:

TABLE I

| | Sodium silico aluminate | | | Calcium silico aluminate, "Nopak" C[1] |
|---|---|---|---|---|
| | "Zeolex" 23 A[1] | "Zeolex" 7[1] | "Zeolex" 7A[1] | |
| Chemical analysis, percent: | | | | |
| $SiO_2$ | 68–70 | 66–68 | 72–75 | 47–50 |
| $Al_2O_3$ | 10–12 | 11–13 | 9–11 | 6–7 |
| $Na_2O$ | 5–7 | 5–7 | 4–6 | |
| CaO | | | | 29–31 |
| Loss on ignition at 900° C | 7–9 | 11–13 | 9–11 | 11–13 |
| Typical properties: | | | | |
| Color | (2) | (2) | (2) | (3) |
| Mean particle diameter (millimicrons) | 40 | 22 | 13 | (4) |
| 325 mesh screen residue, percent | $0.1 | $0.1 | $0.5 | $0.1 |
| Oil absorption (gms./100 gms.) | 125 | 135 | 160 | 230 |
| pH (20%) | 10.0 | 7.0 | 7.0 | 9–10 |
| Specific gravity | 2.1 | 2.1 | 2.05 | 2.1 |
| Form | (5) | (6) | (6) | (6) |
| Bulk density: | | | | |
| Aerated (lbs./cu. ft.) | 3 | 3 | 3 | 3 |
| Packed (lbs./cu. ft.) | 18–20 | 18–20 | 18–20 | 14–16 |

[1] Manufactured by J. M. Huber Co.
[2] Bright white.
[3] White.
[4] About 30 to about 80.
[5] Maximum.
[6] Powder.

The preferred materials for use in the invention are the synthetic akali metal silico aluminates which are of a size magnitude of 10 to 50 millimicrons and these may be used directly without further processing. These preferred materials are commercially available and are prepared from kaolin as exemplified by the following procedure:

A slurry of finely-divided precipitated silica in a solution of aluminum sulfate is prepared by reacting 1343 grams of commercial kaolin with 1463 grams of 95% sulfuric acid in 3150 ml. of water. The slurry is formed by agitating the kaolin with the sulfuric acid in a lead lined autoclave at a temperature of 186° C. for 10 hours. The reaction mass is cooled, discharged and made up to a volume of 7000 cc. by the addition of water.

A separate aqueous solution is prepared containing 3440 grams of sodium disilicate ($Na_2O.2SiO_2$) made up to 15,000 cc.

A strongly agitated body of 10,000 cc. of water is provided in a reaction vessel. The disilicate solution is added to this body until the pH is 10.9. Then the rate of addition of the silicate solution is regulated so that the entire amount is added in about 30 minutes, and the slurry of finely divided precipitated silica suspended in the solution of aluminum sulfate is added, at a point separated as far as practicable from the point of addition of the silicate and at a rate which maintains the pH of the aqueous reaction medium between about 10.5 and 10.9. After all of the silicate solution has been added, the addition of the slurry is continued until the pH has dropped to about 9.0. Stirring is continued for 15 minutes. Thereafter the precipitate is recovered by filtration, washed with water and dried at 110° C. The filter cake is obtained in the form of soft lumps. Upon passing these lumps once through a hammer mill a white powder is obtained, substantially all the particles of which are smaller than .05 micron in their greatest diameter.

Similar preferred materials are prepared by changing the amounts of reactants and, in fact, the composition of these silico aluminates may vary in the mole ratio of elements present. For example, when expressed in terms of oxides, the ratios may range from 0.8 to 1.3 moles of $Na_2O$ per mole of $Al_2O_3$ and from about 6 to 16 moles $SiO_2$ per mole of $Na_2O$ depending upon the type of silicate used and the pH of the final reaction medium. The preferred type of silicate for use in the above process is one containing from 1.4 to 3.3 moles of $SiO_2$ per mole of $Na_2O$ and most preferably, where this ratio is from about 2.3 to about 2.8.

The preferred silico aluminates are characterized by having an amorphous X-ray diffraction pattern. However, on heating at 900° to 1000° C. for about 72 hours, a definite crystalline compound forms which is not identifiable from the literature, but has the following major $d$-spacings and relative intensities:

| $d$—A.: | $I/I_o$ |
|---|---|
| 13.4 | 10 |
| 4.5 | 10 |
| 4.1 | 100 |
| 2.51 | 60 |
| 2.05 | 20 |
| 1.63 | 30 |
| 1.45 | 40 |
| 1.37 | 10 |
| 1.26 | 10 |
| 1.20 | 20 |
| 1.13 | 10 |

Surprisingly, naturally occurring silico aluminates are not operable in the invention even if they possess a particle size on the order of about 200 millimicrons.

The halosilane useful in the invention to make the silico aluminate hydrophobic will be any one or a mixture of those disclosed in U.S. Patent 2,306,222. These compounds will include alkyl (e.g. methyl), aryl (e.g., phenyl), alkaryl (e.g. tolyl) and aralkyl (e.g. phenylmethyl) silicon halides (e.g. chlorides, bromides, etc.). Specific compounds include trimethylmonochlorosilane, dichlorodimethylsilane, monomethyltrichlorosilane, dibromodimethylsilane and the like. Since the temperature of the reaction is relatively low (below about 75° C.) and the reaction is carried out in the presence of the hydrocarbon or halocarbon fluid, there will be no necessity to vaporize the halosilane for treatment of the alkali metal or alkaline earth silico aluminate.

The amount of halosilane used will generally be from about 7% to about 30% by weight of the silico aluminate solid. When less than about 7% is used the efficiency of the defoamer is markedly reduced, due, it is believed, to insufficient hydrophobicity imparted to the particles. When more than about 30% of halosilane is used, the product loses its homogeneity and is less desirable from both a use and economic standpoint. The preferred amount of halosilane will be from about 10% to about 20% by weight of the silico aluminate.

The hydrocarbon or halohydrocarbon fluid used in the invention will be any one of those water-insoluble, organic liquids generally used to make defoaming compositions, as for example those disclosed in U.S. Patent 3,076,768. These liquids will include the hydrocarbon fluids such as mineral hydrocarbons, e.g., naphthenic mineral oils, paraffinic mineral oils, kerosene, and the like, and will also include halohydrocarbons such as fluorinated hydrocarbons, chlorinated hydrocarbons, etc., such as 1-chloronaphthalene.

The defoaming composition of the invention is used in accord with usual practices of employing defoamers in various applications. In applications where defoaming of black liquor is desired, a preferred application, the defoamer is simply injected into the usually hot (ca. 180° F.) aqueous black liquor system with agitation adequate to produce efficient dispersion of the defoamer in the system. Generally, the concentrations of active agent used will be on the order of from 5 to 50 parts (volume basis) per million parts of black liquor. Such concentrations are achieved by adding 20 to 200 cc. per minute of defoamer composition per 1000 gallons per minute of flow of black liquor. This low concentration of active defoamer indicates the high efficiency of its action. Further information as to how to use the defoamers in black liquor is indicated in U.S. Patent 3,207,655.

The following examples will serve to further illustrate the invention.

EXAMPLE 1

(All parts by weight)

A mixture of 3 parts of dimethyldichlorosilane and 77 parts of paraffinic mineral oil (Gulf 333 oil) was thoroughly mixed and 20 parts of sodium silico aluminate having a mean particle diameter of 40 millimicrons ("Zeolex" 23A from J. M. Huber Corporation) was slowly added with additional stirring. This mixture became homogeneous after a few minutes and then 6 parts of a 45% by weight aqueous potassium hydroxide solution was added and the mixture heated with stirring to 65° C. A reaction occurred at this temperature which was almost instantaneous as indicated by a sharp decrease in viscosity of the mixture. The product was then cooled and was ready for use without further processing.

The above example was repeated except that the potassium hydroxide was omitted and the amounts of reactants used was 80 parts of paraffinic mineral oil, 18 parts of sodium silico aluminate, and 2 parts of dimethyldichlorosilane. The product was somewhat more viscous than that obtained with the potassium hydroxide.

EXAMPLE 2

Example 1 was repeated except that a potassium hydroxide solution was replaced with an equivalent quantity (3 parts) of a 50% aqueous sodium hydroxide solution.

Again reaction occurred instantaneously at 65° C. as indicated in Example 1.

The method of evaluation of the defoaming composition was as follows:

Approximately 100 ml. of black liquor at 140° F. is placed in a 250 ml. glass-stoppered graduated cylinder. Then 0.05 ml. of the defoamer composition is added, the cylinder stoppered, shaken vertically for 10 seconds, and finally inverted back and forth five times. The temperature of 140° F. is used for this test because it was found that effective defoaming is more difficult to achieve at this temperature than at higher temperatures.

An effective defoamer causes complete or almost complete deaeration of the foam generated by the above procedure when the defoamer is absent.

The products of Examples 1 and 2 showed excellent defoaming action in the above tests. In addition, the defoaming composition was evaluated in field tests under operating conditions at paper mills. When administered at 20 ml./minute, just before the first vacuum washes, brown stock delivered at 950 to 1000 gallons/minute was completely controlled without foam formation.

In another test under different, but realistic, mill operating conditions, complete foam control was achieved at 90 ml./minute at 1350 gallons/minute of black liquor flow.

EXAMPLE 3

Example 1 was repeated except that the potassium hydroxide solution was replaced with 5.5 parts of triethanolamine. The product was an effective defoamer as indicated by the standard defoaming test described above.

EXAMPLE 4

A mixture of 3 parts of dimethyldichlorosilane and 77 parts of paraffinic oil (Gulf 333 oil) was thoroughly mixed and 20 parts of sodium silico aluminate having a mean particle diameter of 22 millimicrons ("Zeolex" 7 from J. M. Huber Corporation) was slowly added with additional stirring. The reaction was continued as in Example 2. The product was an excellent defoamer.

EXAMPLE 5

A mixture of 150 parts of paraffinic oil and 5.6 parts of dimethyldichlorosilane was thoroughly mixed and 39 parts of the sodium silico aluminate used in Example 1 was slowly added with additional stirring. The mixture became homogeneous after a few minutes and then 5.6 parts of a 60% by weight aqueous solution of tetrapotassium pyrophosphate was added and the mixture heated with stirring to 65° C. The product was tested and found to be an effective defoamer.

EXAMPLE 6

Example 1 was repeated except that 2 parts of powdered sodium methoxide was substituted for the 6 parts of 45% aqueous potassium hydroxide solution. The product obtained was an effective defoamer.

EXAMPLE 7

Example 2 was repeated except that only 1.5 parts of dimethyldichlorosilane was used. The product was observed to be an effective defoamer in the above described test procedure.

EXAMPLE 8

Example 2 was repeated except that the dimethyldichlorosilane was replaced by 3 parts of trimethylmonochlorosilane. The product was an effective defoamer.

EXAMPLE 9

Example 8 was repeated except that the trimethylmonochlorosilane was replaced by 3 parts of methyltrichlorosilane. A total of 5 parts of 50% aqueous sodium hydroxide was added to neutralize the additional acid generated in the reaction. The product was an effective defoamer, being only slightly less effective than the product of Example 2.

EXAMPLE 10

Example 1 was repeated except that the potassium hydroxide solution was replaced by 6.5 parts of dibutylaminoethanol. The product was an effective defoamer.

EXAMPLE 11

Example 2 was repeated except that the sodium silico aluminate was replaced by 20 parts of calcium silico aluminate of mean particle diameter of 30 millimicrons ("Nopak C," J. M. Huber Corporation). The product was an effective defoamer in the tests described above.

EXAMPLE 12

Instead of the mineral oil used in Example 1, 1-chloronaphthalene is used with equivalent results.

EXAMPLE 13

Example 1 is repeated using kerosene as the hydrocarbon fluid and a suitable defoaming composition is obtained.

EXAMPLE 14

A sodium silico aluminate was made by reacting 132 parts of sodium silicate pentahydrate with 21 parts of sodium aluminate and the dried material used to make a defoaming composition as in Example 1 except that the amounts used were 7.5 parts of sodium silico aluminate. 41.4 parts of oil, and 1.1 parts of silane. The product showed good deforming properties for black liquor.

It will be understood that other materials may be added to the defoamer composition to achieve a specific purpose. Thus, for example, thickeners may be added to control viscosity of the final product, fungi and bacterial control agents may be incorporated, or dispersion stabilizers and the like may be added.

Numerous agents similar to the synthetic alkali metal silico aluminates were treated as in Example 1 and subsequently tested in defoaming tests as in Example 2. In all cases, the defoaming action obtained, as measured for reduction of both foam and air entrainment, was unsatisfactory. The following Table II indicates some of the many agents and their properties which are not operative in the invention.

TABLE II

Properties of Various Agents Used Instead of Sodium Silico Aluminate and Treated as in Example 1

| Agent | Particle size (Mean particle diameter) | pH | Oil absorption | Surface area |
|---|---|---|---|---|
| Precipitated, hydrated silica ($SiO_2$) | 22 m$\mu$ | 6.5 to 7.3, 5% in water | 125 to 165 gm. oil/100 gms | 140–160. |
| Do | 13m$\mu$ | 8.5 | 250 b.. oil/100 gms | 300 sq. m./gm. |
| Hydrated aluminum silicate | 200 m$\mu$ | 4.2 to 5.2, 20% in $H_2O$ | 55 gm. oil/100 gms | |
| Hydrated magnesium silicate | {99.5<10$\mu$ / 86.5<5$\mu$ / 26.5<1$\mu$} | | 50 Gardner Coleman | |
| Precipitated $BaSO_4$ | 180$\mu$ | 8.8 to 9.5 | 13.2 to 15.4, Rub out method. | |
| Hydrated precipitated calcium silicate | 30 m$\mu$ | 9.8, 5% in $H_2O$ | 80 to 120 gm. oil/100 gms | 82 to 92 sq. m./gm. |
| Sodium montmorillonite | 200 m$\mu$ | | 50 gm. oil/100 gms | 800 sq. m./gm. |
| Calcium montmorillonite | 5$\mu$ | | 20 gm. oil/100 gms | 600 sq. m./gm. |

It will be observed from a study of the above Table II that many of those inoperable substances have the same particle size and other properties as the operable synthetic alkali metal or alkaline earth metal silico aluminates. While the reason for this specificity is not understood, it is clear that the invention requires the specific synthetic silico aluminates set forth above.

The invention is particularly desirable in that it provides a highly efficient defoaming composition from readily available low cost raw materials. Furthermore, these products are prepared by a simple, one step, low temperature process which does not require complex equipment or technology. It is evident that this invention makes a significant contribution to the art of defoaming compositions, their use and their preparation.

We claim:

1. A composition useful as a defoaming agent consisting essentially of from about 70 to about 95 parts by weight of a hydrocarbon or halohydrocarbon fluid and from about 5 to about 30 parts by weight of a synthetic alkali metal or alkaline earth metal silico aluminate having an average particle size no greater than about 200 millimicrons, said silico aluminate having been made hydrophobic by reaction at a temperature not exceeding about 75° C. in said hydrocarbon or halocarbon fluid with about 7% to about 30% by weight of said silico aluminate of a halosilane.

2. A composition as in claim 1 wherein the hydrocarbon fluid is a paraffinic mineral oil, the silico aluminate is sodium silico aluminate having a particle size from about 10 to about 50 millimicrons, and the halosilane is dichlorodimethylsilane.

3. A composition as in claim 1 wherein the fluid is a paraffinic mineral oil, the silico aluminate is a calcium silico aluminate having a particle size of about 30 millimicrons, and the halosilane is dichlorodimethylsilane.

4. A composition as in claim 1 wherein the halosilane is trimethylmonochlorosilane.

5. A composition as in claim 2 wherein the synthetic silico aluminate is amorphous, but changes to a crystalline compound on heating at 900° to 1000° C. for about 72 hours.

6. A composition as in claim 1 wherein the fluid is kerosene, the silico aluminate is a calcium silico aluminate and the halosilane is methyltrichlorosilane.

7. A process for the preparation of a defoaming composition which comprises reacting at a temperature not exceeding about 75° C. from about 5 to about 30 parts by weight of a synthetic alkali metal or alkaline earth metal silico aluminate having an average particle size no greater than about 200 millimicrons in from about 70 to about 95 parts by weight of a hydrocarbon or halohydrocarbon fluid with a halosilane in an amount from about 7% to about 30% by weight of the silico aluminate.

8. The process of claim 7 wherein the silico aluminate is a sodium silico aluminate having a particle size from about 10 to about 50 millimicrons, the fluid is a paraffinic mineral oil and the halosilane is dichlorodimethylsilane.

9. The process of claim 7 wherein the silico aluminate is a calcium silico aluminate, the fluid is a paraffinic mineral oil and the halosilane is methyltrichlorosilane.

10. The process of controlling foam in aqueous systems which comprises the addition of from about 5 to 50 volume parts per million parts of said aqueous system of a composition consisting essentially of from about 70 to 95 parts by weight of a hydrocarbon or halohydrocarbon fluid and from about 5 to 30 parts by weight of a synthetic alkali metal or alkaline earth metal silico aluminate having an average particle size no greater than about 200 millimicrons, said silico aluminate having been made hydrophobic by reaction at a temperature not exceeding about 75° C. in said hydrocarbon or halocarbon fluid with about 7% to about 30% by weight of said silico aluminate of a halosilane.

11. The process of claim 10 wherein the aqueous system is a black liquor produced in an alkaline pulping process, the fluid is a paraffinic mineral oil, the silico aluminate is a sodium silico aluminate having a particle size from about 10 to about 50 millimicrons, and the halosilane is dichlorodimethylsilane.

References Cited

UNITED STATES PATENTS

| | | |
|---|---|---|
| 2,993,867 | 7/1961 | Wilson. |
| 3,408,306 | 10/1968 | Boylan. |

RICHARD D. LOVERING, Primary Examiner

U.S. Cl. X.R.

162—60; 252—358

UNITED STATES PATENT OFFICE
CERTIFICATE OF CORRECTION

PO-1050 (5/69)

Patent No. 3,573,222                    Dated March 30, 1971

Inventor(s)    George Conrad Harrison, Jr. and Anthony Joseph Stumpo

It is certified that error appears in the above-identified patent and that said Letters Patent are hereby corrected as shown below:

Column 5 (Example 5) line 41 "paraffinic oil" should read

--paraffinic mineral oil--.

Column 5, Example 7) Table II "Precipitated $BaSO_4$ 180 $\mu$"

should read --Precipitated $BaSO_4$ 180 m$\mu$--.

Signed and sealed this 20th day of June 1972.

(SEAL)
Attest:

EDWARD M. FLETCHER, JR.                ROBERT GOTTSCHALK
Attesting Officer                       Commissioner of Patents